United States Patent [19]

Usami

[11] Patent Number: 4,832,243
[45] Date of Patent: May 23, 1989

[54] TRANSFER APPARATUS FOR BELT-LIKE MATERIALS

[75] Inventor: Shigeoki Usami, Kodaira, Japan

[73] Assignee: Bridgestone Corporation, Tokyo, Japan

[21] Appl. No.: 143,879

[22] Filed: Jan. 14, 1988

[30] Foreign Application Priority Data

Jan. 19, 1987 [JP] Japan .................................. 62-9681

[51] Int. Cl.$^4$ ...................... B29D 30/30; B65H 20/32; B65H 23/00
[52] U.S. Cl. ................................. 226/108; 156/405.1; 156/406.4; 226/105; 226/115; 226/118
[58] Field of Search .............................. 226/104–108, 226/111, 113, 115, 118; 198/586, 631; 156/405.1, 406, 406.2, 406.4

[56] References Cited

U.S. PATENT DOCUMENTS

| | | | |
|---|---|---|---|
| 3,323,969 | 6/1967 | Cantarutti et al. | 226/105 X |
| 3,413,174 | 11/1968 | Porter | 156/405.1 |
| 3,647,126 | 3/1972 | Dieterich et al. | 226/105 |
| 4,009,072 | 2/1977 | Schultz et al. | 226/108 X |
| 4,409,872 | 10/1983 | Bertoldo | 156/405.1 X |
| 4,457,802 | 7/1984 | Yanagihara et al. | 156/406.4 X |
| 4,478,329 | 10/1984 | Heiz | 198/586 X |
| 4,681,523 | 7/1987 | Thelen | 198/586 X |
| 4,714,505 | 12/1987 | Goodfellow et al. | 156/405.1 X |
| 4,729,521 | 3/1988 | Kubo et al. | 156/406 X |

Primary Examiner—John Petrakes
Attorney, Agent, or Firm—Sughrue, Mion, Zinn, Macpeak & Seas

[57] ABSTRACT

A transfer apparatus for transferring a belt-like material such as carcass plies, belt plies, inner liners and the like comprises an awaiting conveyor, a movable conveyor provided on a downstream side of the awaiting conveyor and movable in directions substantially in parallel with a transfer direction of a belt-like material, awaiting transmission provided at a downstream end of the awaiting conveyor and transmitting driving power from the awaiting conveyor to the movable conveyor when the movable conveyor is moved to a rearmost position to be jointed with the awaiting transmission, and centering device for centering in width directions a festoon portion of the belt-like material which is formed in a clearance between the awaiting and movable conveyors when the movable conveyor has moved forward away from the awaiting conveyor. The apparatus further comprises a supply conveyor arranged on a downstream side of the movable conveyor and movable in directions substantially in parallel with the transfer direction of the belt-like material, and supply transmission provided at an upstream end of the supply conveyor and transmitting driving power from the supply conveyor to the movable conveyor when the movable conveyor is moved to a forwardmost position to be jointed with the supply transmission.

5 Claims, 4 Drawing Sheets

FIG._2a
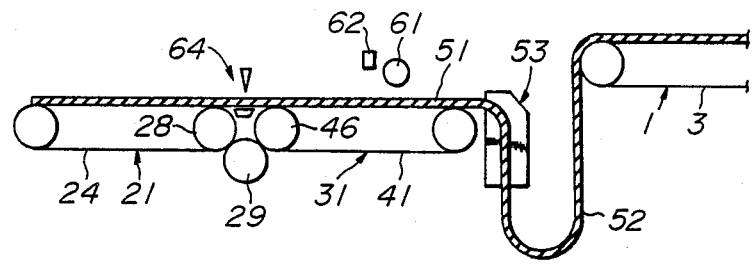
FIG._2b
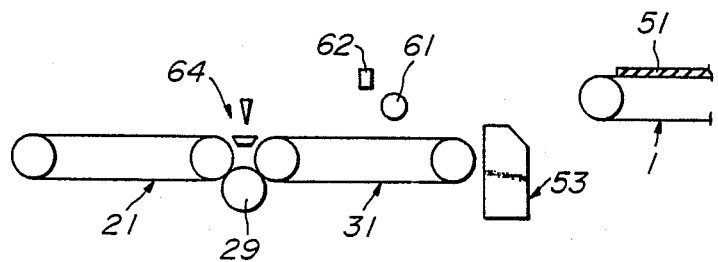
FIG._2c
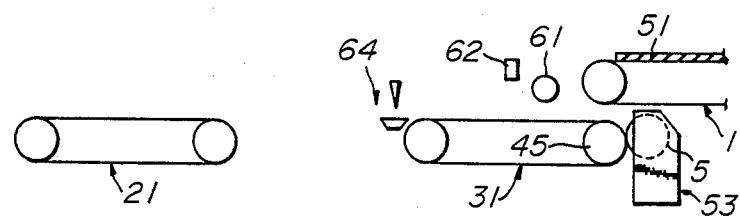

FIG._2d
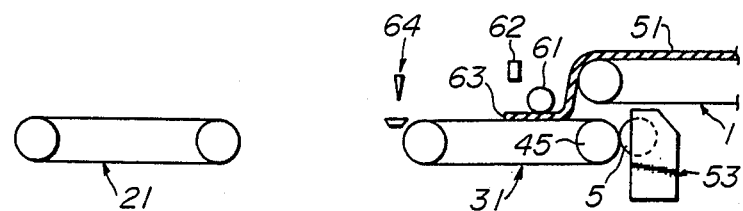
FIG._2e
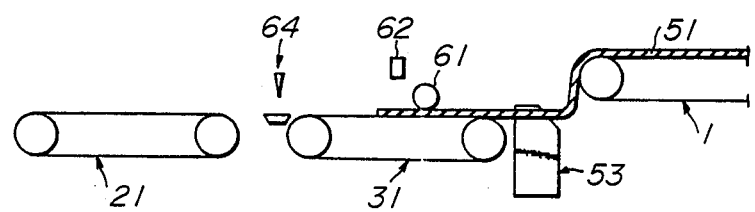
FIG._2f
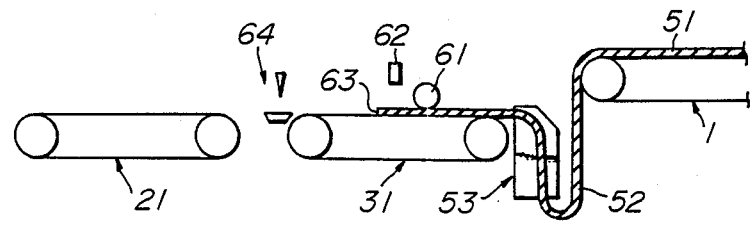

FIG_2g
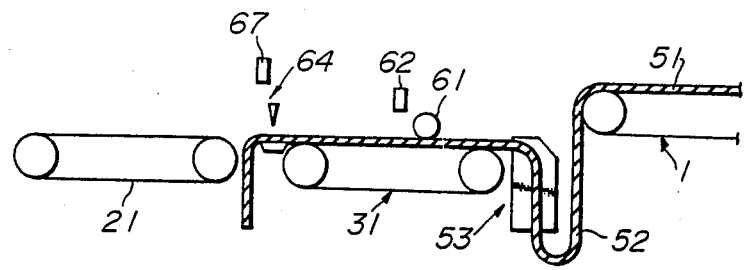
FIG_2h
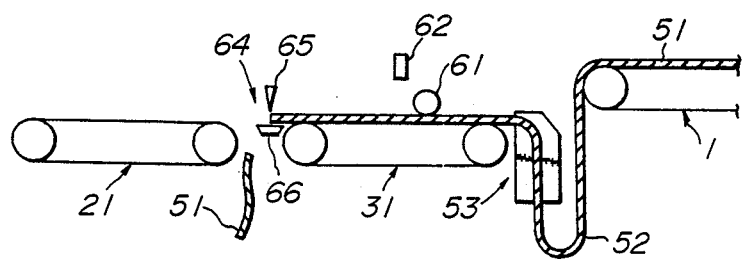
FIG_3
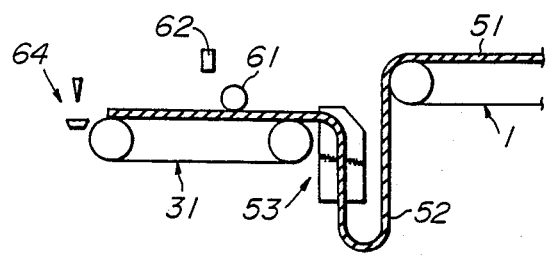

TRANSFER APPARATUS FOR BELT-LIKE MATERIALS

BACKGROUND OF THE INVENTION

This invention relates to a transfer apparatus for transferring a belt-like material forming a festoon portion.

For example, in the tire manufacturing industry, belt-like materials such as carcass plies, belt plies, inner liners and the like are transferred by belt conveyors to be supplied to tire forming drums. The belt-like material is usually paid out from a large diameter roll at a constant speed, while the forming drum is intermittently rotated at a high speed. In prior art apparatuses, there are provided a preconveyor and a postconveyor which are independently driven and spaced apart from each other to form a clearance therebetween, in which a festoon of a belt-like material is formed, which compensates for the difference in rotation between the forming drum and the large diameter roll of the material. Since there is no external force to restrain the festoon portion of the material, centering of the material in width directions is preferably effected at the festoon portion of the material. As a result, centering means has been provided at the position of the festoon portion in the prior art.

In such prior art transfer apparatuses for belt-like materials, as the preconveyor and the postconveyor are spaced and stationary, a belt-like material paid out from the roll must be transferred from the preconveyor to the postconveyor after a preceding end of the material is manually passed through the centering means. Therefore, working efficiency is low and workers are urged to do troublesome working.

SUMMARY OF THE INVENTION

It is a primary object of the invention to provide an improved transfer apparatus for belt-like materials, which eliminates all the disadvantages of the prior art.

In order to accomplish the object, the transfer apparatus for belt-like materials according to the invention, comprises an awaiting conveyor, a movable conveyor provided on a downstream side of said awaiting conveyor and movable in directions substantially in parallel with a transfer direction of a belt-like material, awaiting transmission means provided at a downstream end of the awaiting conveyor and transmitting driving power from said awaiting conveyor to said movable conveyor when the movable conveyor is moved to a rearmost position to be jointed with said awaiting transmission means, and centering means for centering in width directions a festoon portion of said belt-like material which is formed in a clearance between said awaiting and movable conveyors when the movable conveyor has moved forward away from the awaiting conveyor.

In a preferred embodiment of the invention, the apparatus further comprises a supply conveyor arranged on a downstream side of said movable conveyor and movable in directions substantially in parallel with the transfer direction of said belt-like material, and supply transmission means provided at an upstream end of the supply conveyor and transmitting driving power from the supply conveyor to the movable conveyor when the movable conveyor is moved to a forwardmost position to be jointed with said supply transmission means.

It is assumed that a preceding end of a belt-like material is on the awaiting conveyor and waiting for a next operation. At this time, the movable conveyor has been moved to the rearmost position and joined with the awaiting conveyor through the awaiting transmission. When the awaiting conveyor is then operated, its driving power is transmitted to the movable conveyor, so that belts of the awaiting and movable conveyors are driven in synchronism with each other. As a result, the belt-like material is advanced so that a preceding end of the material is transferred from the awaiting conveyor to the movable conveyor without being deformed. The movable conveyor is then advanced supporting the belt-like material. At this moment, the belt of the awaiting conveyor is moved to feed the material forward. When the movable conveyor is moved away from the awaiting conveyor, a clearance is formed between the movable and awaiting conveyors, in which a festoon portion of the material is formed. The belt-like material at the festoon portion is then subjected to the centering in width directions by the centering means. With the apparatus comprising the supply conveyor, when the movable conveyor is advanced, it is jointed with the supply conveyor through the supply transmission. When the belt or the supply conveyor is moved under this condition, the belt of the movable conveyor is also moved synchronized with the supply conveyor by the driving power from the supply conveyor through the supply transmission. Therefore, the preceding end of the material is transferred forward from the movable conveyor to the supply conveyor without being deformed. The preceding end of the material is transferred from the awaiting conveyor to the movable conveyor and from it to the supply conveyor automatically with high efficiency in this manner. With the apparatus having the supply conveyor, moreover, the operation of supplying the material from the supply conveyor to the forming drum and the operation of transferring the material from the awaiting conveyor to the movable conveyor are simultaneously carried out.

The invention will be more fully understood by referring to the following detailed specification and claims taken in connection with the appended drawings.

BRIEF DESCRIPTION OF THE DRAWINGS

FIGS. 2a–2h are views for explaining the operation of the transfer apparatus according to the invention; and FIG. 3 is a schematic side view illustrating another embodiment of the invention.

DESCRIPTION OF THE PREFERRED EMBODIMENT

Figure 1:
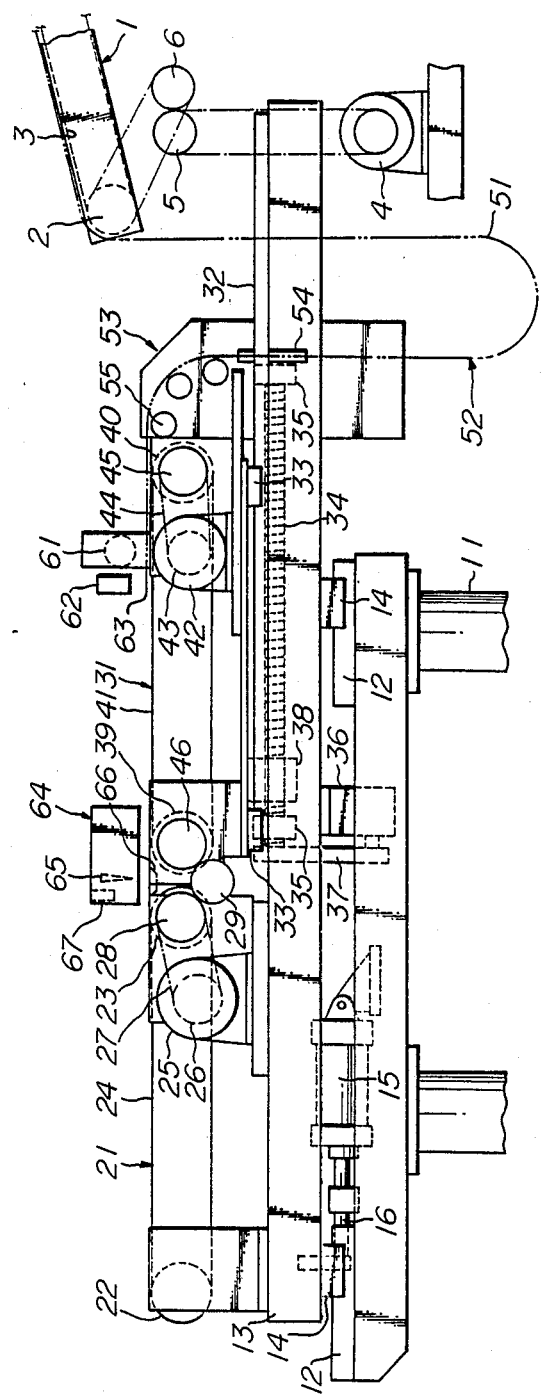
FIG. 1 is a schematic side view of one embodiment of the transfer apparatus according to the invention.

Referring to FIG. 1, an apparatus according to the invention, comprises an awaiting conveyor 1 having an endless belt 3 extending about a roller 2. The roller 2 is driven by a driving motor 4 whose driving power is transmitted to an idling or reversing gear 5 as an awaiting transmission provided in front or downstream of the awaiting conveyor 1 and then transmitted through a driving gear 6 in mesh with the reversing gear 5 to the roller 2.

The term "reversing gear 5" and "gears 45" later explained used herein are intended to designate "toothed pulleys for toothed belts" preventing any slip. The reversing gear 5 is in mesh with the gear 46 to transmit driving power. Therefore, it should be understood that the term "gear" used herein consists of a toothed pulley and a gear integrally formed therewith. It holds true in a gear 28 as explained later.

In a forward position of the awaiting conveyor 1, there is provided a frame 11 on which rails 12 are arranged in longitudinal directions of the frame 11. A horizontal frame 13 is arranged above and in parallel with the frame 11 and is provided with slide bearings 14 secured to a lower surface of the horizontal frame 13. The slide bearings 14 slidably engage the rails 12 so that the horizontal frame 13 is horizontally movably supported by the frame 11.

As shown in FIG. 1, there is provided a piston and cylinder assembly 15 having a piston rod 16 whose end is connected to the horizontal frame 13. As a result, the horizontal frame 13 is driven in the longitudinal directions of the frame 11 by actuating the piston and cylinder assembly 15. Above a forward portion of the horizontal frame 13 is arranged a supply conveyor 21 comprising a pair of rollers 22 and 23 spaced in the longitudinal directions of the frame 11 and a belt 24 extending about the pair of rollers 22 and 23. On the horizontal frame 13 is fixed a driving motor 25 whose driving power is transmitted to the roller 23 through a gear 26, a timing belt and a gear 28. As a result, the supply conveyor 21 is positioned remote from and forward of the awaiting conveyor 1. Moreover, the supply conveyor 21 is provided at its rear or upstream end with an idling or reversing gear 29 as a supply transmission normally in mesh with the gear 28.

A movable conveyor 31 extending in the longitudinal directions of the frame 11 is arranged downstream of the awaiting conveyor 1 and upstream of the supply conveyor 21. The length of the movable conveyor 31 in its longitudinal direction is shorter than a distance between the downstream end of the awaiting conveyor 1 and the upstream end of the supply conveyor 21. As a result, there is always a clearance between the awaiting conveyor 1 and the movable conveyor 31 and 1 or between the supply conveyor 21 and the movable conveyor 31. On a surface of a rearward portion of the horizontal frame 13 is arranged rails 32 in parallel with the rails 12. The movable conveyor 31 is provided with slide bearings 33 which are secured to a lower surface of the movable conveyor and slidable on the rails 32, so that the movable conveyor 31 is supported movably in the longitudinal directions by the horizontal frame 13.

A screw-thread shaft 34 is arranged in parallel with the rails 32 and supported through bearings 35 by the horizontal frame 13 immediately below the movable conveyor 31. A motor 36 is fixed to the horizontal frame 13, whose driving power is transmitted to the screw-thread shaft 34 through a timing belt 37. To the lower surface of the movable conveyor 31 is fixed an internal thread block 38 which engages the screw-thread shaft 34 so that the movable conveyor 31 is driven in the longitudinal directions when the screw-thread shaft 34 is rotated by energization of the motor 36.

The movable conveyor 31 comprises a pair of rollers 39 and 40 spaced in the longitudinal directions and a belt 41 extending about the pair of rollers 39 and 40. To the movable conveyor 31 is fixed a driving motor 42 whose driving power is transmitted to the roller 40 through a gear 43, a timing belt 44 and a gear 45 having a clutch which brings the gear 45 into connection with an idling or reversing gear 5. The roller 39 has a gear 46 adapted to be engaged with the reversing gear 29.

A belt-like material 51 for constituting a tire portion, such as a carcass ply, belt ply, inner liner or the like is paid out at a constant speed from a large diameter roll (not shown) arranged rearward or upstream of the awaiting conveyor 1 and forward transferred to a forming drum by means of the awaiting, movable and supply conveyors 1, 31 and 21. In this embodiment, moreover, as there is a clearance between the awaiting and movable conveyors 1 and 31, the belt-like material 51 depends from the downstream end of the awaiting conveyor 1 and the upstream end of the movable conveyor 31 to form a festoon portion 52 of the material in the clearance. The movable conveyor 31 is provided at its rear end with centering means 53 for centering the belt-like material in width directions. The centering means 53 comprises regulating plates 54 arranged on both sides of the width direction of the belt-like material. These regulating plates 54 are always spaced from a regulating position by an equal distance and moved toward and away from each other by means of a motor (not shown). Reference numeral 55 denotes three guide rollers. A restraining roller 61 is vertically movably arranged above the movable conveyor 31. A detection sensor 62 detects a preceding end 63 of the belt-like material 51 to control the lowering and raising of the restraining roller 61 and the operation of the motor 36. Cutting means 64 arranged at the forward end of the movable conveyor 31 comprise a cutter 65 for cutting the belt-like material 51 along the width directions, and a support base. A detection sensor 67 detects the preceding end 63 of the belt-like material to control the operation of the cutting means 64 and the motor 36.

The operation of the apparatus of this embodiment will be explained hereinafter.

It is assumed that the belt-like material 51 paid out of the roll is transferred forward so as to be supplied into a forming drum (not shown) by means of the belts 3, 41 and 24 of the awaiting, movable and supply conveyors 1, 31 and 21 traveling at an equal speed. As the movable conveyor 31 has been advanced to a forwardmost position in this case, the reversing gear 29 engages the gear 46 so that the driving power of the supply conveyor 21 is transmitted to the movable conveyor 31. On the other hand, since there is the clearance between the awaiting conveyor 1 and the movable conveyor 31, a festoon portion 52 of the belt-like material 51 is formed in the clearance. As a result, even if the belt-like material 51 is paid out from the roll at a constant speed and the material 51 is intermittently supplied at a high speed into the forming drum, such a difference in speed of the material may be taken by the festoon portion 52 to maintain tensile forces in the material at a constant value. In this case, the regulating plates 54 are urged against the belt-like material from both the sides of the width directions, so that the traveling belt-like material 51 is subjected to a centering action in the width directions.

If it is required to change the types of the belt-like material, the supply and movable conveyors 21 and 31 are moved away from the forming drum by retracting the piston rod 16 of the piston and cylinder assembly 15. Thereafter the roll of the material is replaced by a new roll consisting of a required material. The belt-like material 51 is then paid out from the new roll. The material is transferred onto the awaiting conveyor 1 until a preceding end 63 of the material 51 arrives at the downstream end of the awaiting conveyor and waits at this position for a next operation as shown in FIG. 2b.

The motor is then energized to move the regulating plates 54 away from each other. The motor 36 is then energized to rotate the screw-thread shaft 34 to cause the movable conveyor 31 to retreat along the rails 32 toward the awaiting conveyor 1. When the movable conveyor 31 has retreated to the rearmost position and the gear 45 has engaged the reversing gear 5 of the awaiting conveyor 1 as shown in FIG. 2c, the retreat of the movable conveyor 31 is stopped.

Thereafter, the belt-like conveyor 51 is transferred forward by means of the awaiting conveyor 1. In transferring the material, the preceding end of the material 51 depends from the downstream end of the awaiting conveyor 1 and then rides on the movable conveyor. As the movable conveyor 31 has been connected to the awaiting conveyor 1 through the reversing gear 5 as above described, the driving force of the awaiting conveyor 1 is transmitted to the movable conveyor 31 so that the belt of the movable conveyor 31 is driven in synchronism with the awaiting conveyor 31 at the same speed and in the same direction as those of the awaiting conveyor 31. As a result, the preceding end of the belt-like material 51 is transferred onto the movable conveyor 31 without being deformed.

Thereafter, when the preceding end 63 of the belt-like material 51 is detected by the detection sensor 62, the restraining roller 61 is lowered to urge the material 51 against the movable conveyor 31, while the conveyor 31 is advanced toward the supply conveyor 21 by the screw-thread shaft 34 rotatively driven by the motor 36 as shown in FIG. 2d. Since the advancing speed of the movable conveyor 31 is substantially equal to the moving speed of the belt of the awaiting conveyor 1, the belt-like material 51 does not form a festoon portion.

Thereafter, when the movable conveyor 31 has arrived at a substantial mid point between the awaiting and supply conveyors 1 and 21 as shown in FIG. 2e, the movable conveyor 31 is stopped. At this moment, the driving motor 42 is energized to drive the belt 41 of the movable conveyor 31 at a low speed lower than the speed of the belt 3 of the awaiting conveyor 1. As a result, the belt-like material 51 starts to slacken between the awaiting and movable conveyors 1 and 31 until a festoon portion 52 of the material 51 is formed in the clearance between the conveyors 1 and 31. When the festoon portion 52 enters between the regulating plates 54, they approach and contact side edges of the material 51 to start the centering of the material 51.

When the hanging festoon 52 becomes of a predetermined amount as shown in FIG. 2f, the rotating speed of the driving motor 42 is accelerated to increase the moving speed of the belt 41 of the movable conveyor 31 to the speed equal to the moving speed of the belt 3 of the awaiting conveyor 1. As a result, the belt-like material 51 is transferred forward by the awaiting and movable conveyors 1 and 31.

The preceding end 63 of the belt-like material 51 is then detected by the detection sensor 67. After detection, the driving motor 42 continues its operation for a predetermined period of time and then stops. As a result, the belt-like material 51 is transferred forward through a distance corresponding to the length of the material 51 which has not been subjected to the centering, so that the preceding end of the material hangs from the downstream end of the movable conveyor 31 as shown in FIG. 2g. At this moment, the cutter 65 of the cutting means 64 lowers downward until it abuts against the support base 66 so that the belt-like material 51 is cut at a predetermined position along a line in the width direction of the material. The preceding end of the material 51 not subjected to centering is cut off and discarded in this manner so that only the portion of the material securely subjected to centering is then forward transferred.

Thereafter, the motor 36 is again energized to cause the movable conveyor 31 to advance at the speed equal to the moving speed of the belt of the awaiting conveyor 1 until the movable conveyor arrives at the forwardmost position where the gear 46 engages the reversing gear 29. As a result, the supply and movable conveyors 21 and 31 are jointed by the reversing gear 29 so that the belts of these conveyors 21 and 31 move at the equal speeds in the same direction in synchronism with each other. The belt-like material 51 is therefore transferred from the movable conveyor 31 to the supply conveyor 21 without any deformation of the material and continuously forward transferred.

The restraining roller 61 is then raised and the supply and movable conveyors 21 and 31 are advanced by extending the piston rod 16 of the piston and cylinder assembly 15 for supplying the belt-like material 51 to the forming drum. According to the invention the preceding end 63 of the belt-like material 51 can be transferred from the awaiting conveyor 1 to the supply conveyor 21 only by advancing and retreating the movable conveyor 31 without requiring any manual operation. Moreover, the belt of the movable conveyor 31 is driven by part of the driving force for the belts of the awaiting and supply conveyors 1 and 21 to ensure the complete synchronism of these belts of the conveyors 31, 1 and 21, so that there is no risk of the belt-like material being deformed in transferring it from the awaiting conveyor to the forming drum.

In this embodiment, furthermore, the belt-like material 51 is transferred from the awaiting conveyor 1 to the movable conveyor 31, while the preceding portion of the material on the supply conveyor 21 is simultaneously supplied and attached on the forming drum, thereby improving the working efficiency.

Although there are provided the three conveyors or the awaiting, movable and supply conveyors 1, 31 and 21 for transferring the belt-like material, the supply conveyor 21 may be dispensed with for simplifying the construction and saving the manufacturing cost as shown in FIG. 3. In this case, however, the belt-like material 51 is directly supplied from the movable conveyor 31 to the forming drum, so that the operation of transferring the material 51 from the awaiting conveyor 1 to the movable conveyor 31 and the operation of supplying the material on the movable conveyor 31 onto the forming drum cannot be simultaneously effected. Moreover, the cutting means 64 is kept for example at an above position spaced from the downstream end of the movable conveyor 31 except when the material 51 is to be cut.

As can be seen from the above description, according to the invention a preceding end of a belt-like material can be automatically transferred from the awaiting conveyor to the movable conveyor and further to the supply conveyor with high efficiency.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A transfer apparatus for belt-like materials, comprising an awaiting conveyor, a movable conveyor provided on a downstream side of said awaiting conveyor and having driving means for driving said movable conveyor in directions substantially in parallel with a transfer direction of a belt-like material, awaiting transmission means provided at a downstream end of the awaiting conveyor and transmitting driving power from said awaiting conveyor to said movable conveyor when said movable conveyor is moved by said driving means to a rearmost position to be engaged by said awaiting transmission means, and centering means for centering in width directions a festoon portion of said belt-like material which is formed in a clearance between said awaiting and movable conveyors when said movable conveyor has moved forward away from the awaiting conveyor.

2. A transfer apparatus as set forth in claim 1, wherein said apparatus further comprises a supply conveyor arranged on a downstream side of said movable conveyor and having driving means for driving said supply conveyer in directions substantially in parallel with the transfer direction of said belt-like material, and supply transmission means provided at an upstream end of the supply conveyor and transmitting driving power from the supply conveyor to the movable conveyor when the movable conveyor is moved to a forwardmost position to be engaged by said supply transmission means.

3. A transfer apparatus as set forth in claim 2, wherein said supply transmission means comprises reversing gear means arranged at an upward end of the supply conveyor and normally in mesh with said driving means for driving the supply conveyor and in mesh with driving means for driving said movable conveyor only when the movable conveyor is at a forwardmost position.

4. A transfer apparatus as set forth in claim 1, wherein said awaiting transmission means comprises driving means for driving said awaiting conveyor, reversing gear means included in driving means for driving said awaiting conveyor and gear means having a clutch included in driving means for driving said movable conveyor, said gear means being engaged with said reversing gear means when the movable conveyor is moved to its rearmost position by said driving means for said movable conveyor.

5. A transfer apparatus as set forth in claim 1, wherein said centering means comprises regulating plates arranged on both sides of a width direction of the belt-like material and positioned spaced from a regulating position by an equal distance and means from moving said regulating plates toward and away from each other.

* * * * *